US012752613B2

(12) United States Patent
Lin et al.

(10) Patent No.: US 12,752,613 B2
(45) Date of Patent: Oct. 6, 2026

(54) VEHICLE WINDOW ASSEMBLY AND ASSEMBLY METHOD THEREFOR, AND VEHICLE

(71) Applicant: FUYAO GLASS INDUSTRY GROUP CO., LTD., Fuqing (CN)

(72) Inventors: Qiming Lin, Fuqing (CN); Lixing Jiang, Fuqing (CN); Wenjuan Yu, Fuqing (CN); Qingtuan Hu, Fuqing (CN); Hua Chen, Fuqing (CN); Xiuyong Ou, Fuqing (CN); Ke Zhang, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 274 days.

(21) Appl. No.: 18/632,920

(22) Filed: Apr. 11, 2024

(65) Prior Publication Data

US 2024/0253438 A1 Aug. 1, 2024

Related U.S. Application Data

(63) Continuation of application No. PCT/CN2022/128163, filed on Oct. 28, 2022.

(30) Foreign Application Priority Data

Oct. 29, 2021 (CN) ......................... 202111272000.3

(51) Int. Cl.
*B60J 10/265* (2016.01)
*B60J 10/18* (2016.01)
(Continued)

(52) U.S. Cl.
CPC ............. *B60J 10/265* (2016.02); *B60J 10/18* (2016.02); *B60J 10/70* (2016.02); *B60R 13/04* (2013.01)

(58) Field of Classification Search
CPC ... B60J 1/004; B60J 1/005; B60J 1/006; B60J 1/17; B60J 10/265; B60J 10/18; B60J 10/70
See application file for complete search history.

(56) References Cited

U.S. PATENT DOCUMENTS

2018/0290526 A1 10/2018 Nishikawa

FOREIGN PATENT DOCUMENTS

CN 102529650 A 7/2012
CN 103754170 A 4/2014
(Continued)

OTHER PUBLICATIONS

Extended European search report dated Jan. 7, 2025 received in European Patent Application No. 22886105.0.
(Continued)

*Primary Examiner* — Nicholas McFall
*Assistant Examiner* — Eric Acosta
(74) *Attorney, Agent, or Firm* — SCULLY, SCOTT, MURPHY & PRESSER, P.C.

(57) ABSTRACT

A vehicle window assembly and an assembly method therefor, and a vehicle. The vehicle window assembly includes an exterior decorative member, an encapsulation assembly, and a guide rail. The encapsulation assembly is disposed around a periphery of the exterior decorative member and wraps at least part of the periphery of the exterior decorative member. The encapsulation assembly has a first end and a second end in a direction of an edge S of the exterior decorative member, and the second end is far away from the first end. A limiting groove is defined at the first end of the encapsulation assembly. The guide rail has one end inserted into the limiting groove to limit the guide rail from moving. The
(Continued)

guide rail is connected to the second end of the encapsulation assembly to fix the guide rail to the encapsulation assembly.

18 Claims, 14 Drawing Sheets

(51) Int. Cl.

| | |
|---|---|
| ***B60J 10/70*** | (2016.01) |
| ***B60R 13/04*** | (2006.01) |

(56) References Cited

FOREIGN PATENT DOCUMENTS

| | | | | |
|---|---|---|---|---|
| CN | 103978871 | A | | 8/2014 |
| CN | 106945493 | A | | 7/2017 |
| CN | 208277817 | U | | 12/2018 |
| CN | 208359884 | U | * | 1/2019 |
| CN | 211730992 | U | | 10/2020 |
| CN | 213705120 | U | | 7/2021 |
| CN | 113352858 | A | | 9/2021 |
| CN | 113511056 | A | | 10/2021 |
| DE | 102018221818 | A1 | | 6/2019 |
| EP | 3284571 | A1 | | 2/2018 |
| JP | 2014073759 | A | | 4/2014 |
| JP | 2016052807 | A | | 4/2016 |
| JP | 2019172134 | A | | 10/2019 |

OTHER PUBLICATIONS

International Search Report dated Jan. 20, 2023 issued in PCT/CN2022/128163.

Notice of Allowance dated Jun. 15, 2022 issued in CN 202111272000.3.

* cited by examiner

S310: THE GUIDE RAIL IS OBLIQUELY INSERTED INTO THE LIMITING GROOVE ALONG THE ABUTTING SURFACE

↓

S320: THE GUIDE RAIL IS ROTATED WITH THE FIRST END AS A CENTER TO MAKE THE GUIDE RAIL GRADUALLY APPROACH THE SECOND END UNTIL THE GUIDE RAIL ABUTS THE SECOND END

VEHICLE WINDOW ASSEMBLY AND ASSEMBLY METHOD THEREFOR, AND VEHICLE

CROSS-REFERENCE TO RELATED APPLICATION(S)

This application is a continuation of International Application No. PCT/CN2022/128163, filed Oct. 28, 2022, which claims priority to Chinese Patent Application No. 202111272000.3, filed Oct. 29, 2021, the entire disclosure of which are hereby incorporated by reference.

TECHNICAL FIELD

The present disclosure relates to the field of vehicle spare parts, in particular to a vehicle window assembly and an assembly method therefor, and a vehicle.

BACKGROUND

Currently, a vehicle window assembly applied to a vehicle is composed of an exterior decorative member, an encapsulation assembly, and a guide rail. In the related art, the guide rail is fixed to the encapsulation assembly by bolts in fit with nuts. However, this kind of assembly may extend the manufacturing period.

SUMMARY

In a first aspect, a vehicle window assembly is provided in the disclosure. The vehicle window assembly includes an exterior decorative member, an encapsulation assembly, and a guide rail. The encapsulation assembly is disposed around a periphery of the exterior decorative member and wraps at least part of the periphery of the exterior decorative member. The encapsulation assembly has a first end and a second end in a direction of an edge of the exterior decorative member, and the second end is far away from the first end. A limiting groove is defined at the first end of the encapsulation assembly. The guide rail has one end inserted into the limiting groove to limit the guide rail from moving. The guide rail is connected to the second end of the encapsulation assembly to fix the guide rail to the encapsulation assembly.

In a second aspect, a vehicle is provided in the disclosure. The vehicle includes a vehicle body and a vehicle window assembly. The vehicle window assembly is mounted on the vehicle body. The vehicle window assembly includes an exterior decorative member, an encapsulation assembly, and a guide rail. The encapsulation assembly is disposed around a periphery of the exterior decorative member and wraps at least part of the periphery of the exterior decorative member. The encapsulation assembly has a first end and a second end in a direction of an edge of the exterior decorative member, and the second end is far away from the first end. A limiting groove is defined at the first end of the encapsulation assembly. The guide rail has one end inserted into the limiting groove to limit the guide rail from moving. The guide rail is connected to the second end of the encapsulation assembly to fix the guide rail to the encapsulation assembly.

In a third aspect, an assembly method for a vehicle window assembly is provided in the disclosure. The assembly method for the vehicle window assembly includes the following. An exterior decorative member is provided. An encapsulation assembly that wraps at least part of a periphery of the exterior decorative member is formed. The encapsulation assembly has a first end and a second end in a direction of an edge of the exterior decorative member. The second end is far away from the first end, and a limiting groove is defined at the first end of the encapsulation assembly. A guide rail is inserted into the limiting groove and is fixed to the second end. The limiting groove is configured to limit the guide rail from moving, and the limiting groove and the second end are configured to fix the guide rail cooperatively.

BRIEF DESCRIPTION OF THE DRAWINGS

In order to describe technical solutions in embodiments of the disclosure more clearly, the following will give a brief introduction to the accompanying drawings required for describing embodiments. Apparently, the accompanying drawings hereinafter described are merely some embodiments of the disclosure. Based on these drawings, those of ordinary skill in the art can also obtain other drawings without creative effort.

FIG. 16 is a structural view of an exterior decorative member assembled with an encapsulation assembly according to the assembly method for a vehicle window assembly in

FIG. 14.

DETAILED DESCRIPTION

The following will describe technical solutions of embodiments with reference to the accompanying drawings. Apparently, embodiments described herein are merely some embodiments, rather than all embodiments, of the disclosure. Based on the embodiments described herein, all other embodiments obtained by those of ordinary skill in the art without creative effort shall fall within the protection scope of the disclosure.

The term "embodiment" referred to in embodiments of the disclosure means that a particular feature, structure, or characteristic described in conjunction with the embodiment may be contained in at least one embodiment of the disclosure. The phrase appearing in various places in the specification does not necessarily refer to the same embodiment, nor does it refer to an independent or alternative embodiment that is mutually exclusive with other embodiments. It is explicitly and implicitly understood by those skilled in the art that an embodiment described herein may be combined with other embodiments.

Figure 1:
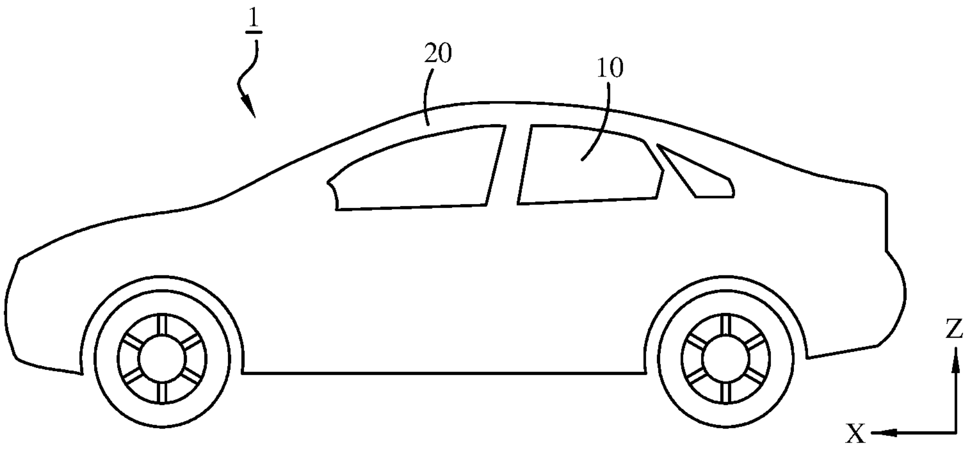
FIG. 1 is a schematic view of a vehicle provided in embodiments of the disclosure.

Reference is made to FIG. 1, a vehicle 1 is provided in the disclosure. The vehicle 1 may be but is not limited to a car, a multi-purpose vehicle (MPV), a sport/suburban utility vehicle (SUV), an off-road vehicle (ORV), a pick-up truck, a van, a bus, a truck, etc. The vehicle 1 includes a vehicle body 20 and a vehicle window assembly 10 of any of the following embodiments. The vehicle window assembly 10 is mounted directly or indirectly on the vehicle body 20. The vehicle window assembly 10 may be but is not limited to a front door window, a rear door window, a rear window, etc. The vehicle window assembly 10 is light-transmitting, so that a vehicle is well-lit inside and people inside the vehicle may have a clear view.

For better description, a XYZ plane coordinate system is defined from a perspective of FIG. 1. An X-axis is parallel to a driving direction of the vehicle 1, a Y-axis is parallel to a width direction of the vehicle 1, and a Z-axis is parallel to a height direction of the vehicle 1. The description of the coordinate system involved in the following may be referred to this. It may be noted that, the Y-axis is not illustrated in FIG. 1 because the Y-axis is perpendicular to the plane.

The following will introduce a specific structure of the vehicle window assembly 10 with reference to the accompanying drawings.

Figure 2:
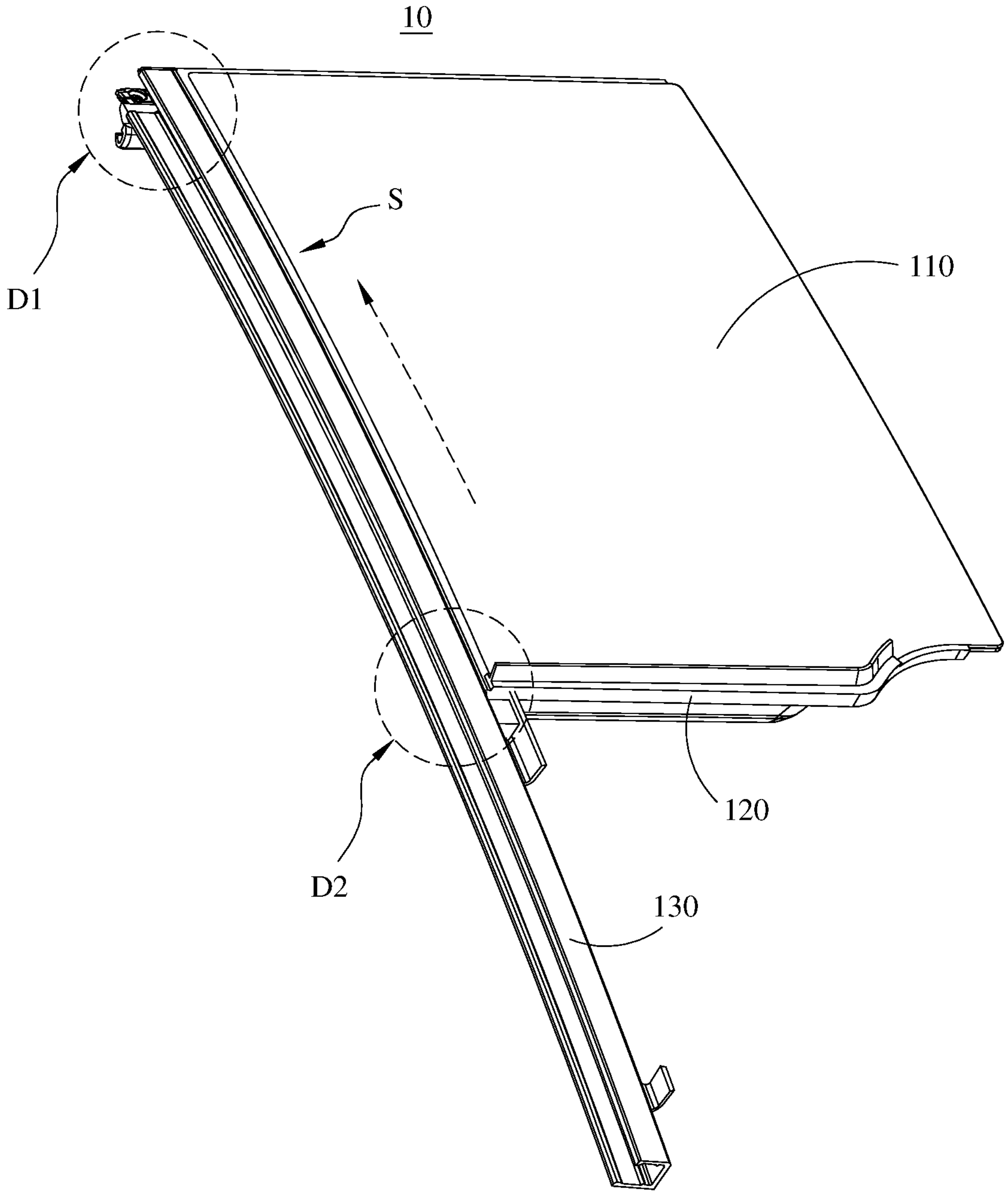
FIG. 2 is a schematic view of a vehicle window assembly provided in an embodiment of the disclosure.
Figure 3:
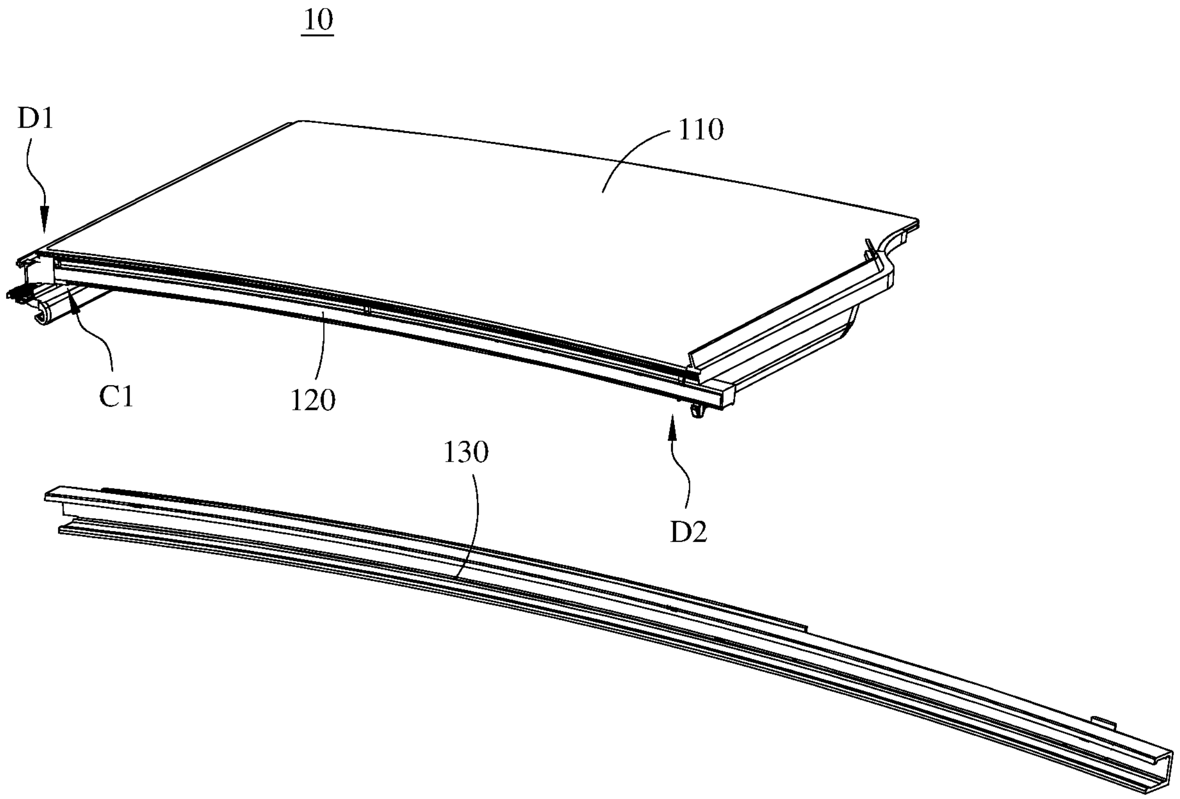
FIG. 3 is an exploded schematic view of a vehicle window assembly provided in embodiments of the disclosure.

Reference is made to FIG. 2 and FIG. 3, a vehicle window assembly 10 is provided in the disclosure. The vehicle window assembly 10 includes an exterior decorative member 110, an encapsulation assembly 120, and a guide rail 130. The encapsulation assembly 120 is disposed around a periphery of the exterior decorative member 110 and wraps at least part of the periphery of the exterior decorative member 110. The encapsulation assembly 120 has a first end D1 and a second end D2 in a direction of an edge S of the exterior decorative member 110, and the second end D2 is far away from the first end D1. A limiting groove C1 is defined at the first end D1 of the encapsulation assembly 120. The guide rail 130 has one end inserted into the limiting groove C1 to limit the guide rail 130 from moving. The guide rail 130 is connected to the second end D2 of the encapsulation assembly 120 to fix the guide rail 130 to the encapsulation assembly 120. In FIG. 2, a direction indicated by a dashed arrow represents the direction of the edge S.

Specifically, the exterior decorative member 110 may be light-transmitting, so that lights from the outside may enter the vehicle. Material of the exterior decorative member 110 may be but is not limited to light-transmitting glass, light-transmitting plastic (such as Polycarbonate (PC), Polymethylmethacrylate (PMMA)), etc., where the glass may also be a laminated glass, a tempered glass, a zone-tempered glass, etc. The approximate shape of the exterior decorative member 110 may be but is not limited to a quadrilateral, a triangle, etc. In other embodiments, the exterior decorative member 110 may opaque, for example, the exterior decorative member 110 is an opaque B pillar trim panel.

The encapsulation assembly 120 is ring-shaped, and the shape of the encapsulation assembly 120 is similar to a peripheral outline of the exterior decorative member 110. The encapsulation assembly 120 is configured to wrap the periphery of the exterior decorative member 110, so as to protect the exterior decorative member 110. The term "wrap" may refer to as half-wrapped or all-wrapped. The term "periphery" means a peripheral edge of the exterior decorative member 110. The encapsulation assembly 120 may wrap all peripheral edges of the exterior decorative member 110, or may wrap part of the peripheral edges of the exterior decorative member 110. For example, a quadrilateral exterior decorative member 110 has four edges, in an embodiment, the encapsulation assembly 120 may wrap all four edges of the quadrilateral exterior decorative member 110. In another embodiment, the encapsulation assembly 120 may wrap any three, two, or one of the four edges.

The guide rail 130 is configured to be connected to the vehicle body 20. Material of the guide rail 130 may be but is not limited to plastic and metal (for example, aluminum alloy). The guide rail 130 is long-strip-shaped and is fixedly connected to the encapsulation assembly 120. It may be noted that, a fixed connection does not refer to a non-detachable connection, but rather to a connection in which two elements are connected as a whole. In some embodiments, the guide rail 130 and the encapsulation 120 may be detachably connected. The encapsulation assembly 120 has the first end D1 and the second end D2 in a direction of an edge of the exterior decorative member 110. The guide rail 130 is connected to the first end D1 and the second end D2. The limiting groove C1 is defined at the first end D1 of the encapsulation assembly 120, and an opening direction of the limiting groove C1 faces towards the second end D2. The guide rail 130 has one end inserted into the limiting groove C1, and the limiting groove C1 may limit a freedom degree of the movement of the guide rail 130 so as to have a limiting function and a positioning function. In addition, the guide rail 130 is also connected to the second end D2 to fix the guide rail 130 to the encapsulation assembly 120. It may be noted that, the connection between the guide rail 130 and the second end D2 may be but is not limited to, bonding, clamping, or connecting through threaded parts, etc.

In the related art, the guide rail 130 is fixed to the encapsulation assembly 120 usually by bolts in fit with nuts. Specifically, the nuts are embedded in the encapsulation assembly 120 in advance, and then the bolts penetrate through the guide rail 130 and are connected to the nuts in the encapsulation assembly 120 after the guide rail 130 and the encapsulation assembly 120 complete positional fitting.

In this way, the guide rail 130 is fixed to the encapsulation assembly 120. However, since the guide rail 130 has a certain length, at least two or three bolts are needed to be disposed at a length direction of the guide rail 130 and connected to the corresponding nuts. Moreover, embedding the nuts in the encapsulation assembly 120 in advance takes a certain amount of time, resulting in a long manufacturing period and a cumbersome assembly process.

In the vehicle window assembly 10 provided in the disclosure, the encapsulation assembly 120 has the first end D1 and the second end D2. The limiting groove C1 is defined at the first end D1, and the limiting groove C1 may accommodate at least part of the guide rail 130. Therefore, during the assembly process, one end of the guide rail 130 may be inserted into the limiting groove C1 defined at the first end D1, then the guide rail 130 may be connected to the second end D2, so as to fix the guide rail 130 to the encapsulation assembly 120. It can be understood that, inserting the guide rail 130 into the limiting groove C1 is a simple operation. Moreover, the limiting groove C1 having a function of positioning the guide rail 130 can make a position on the guide rail 130 at which the guide rail 130 is connected to the second end D2 is faced with the second end D2, thereby ensuring that the guide rail 130 is correctly connected to the second end D2. After the guide rail 130 is successfully connected to the second end D2, the first end D1 may have a limiting function, which means that the limiting groove C1 may limit a freedom degree of the movement of the guide rail 130, so as to fix the guide rail 130 to the encapsulation assembly 120 through the cooperation of the first end D1 and the second end D2. That is, compared with the related art, the limiting groove C1 of the vehicle window assembly 10 provided in the disclosure can simplify the assembly of the guide rail 130 and the encapsulation assembly 120, thereby shortening the manufacturing period and improving capacity.

Figure 4:
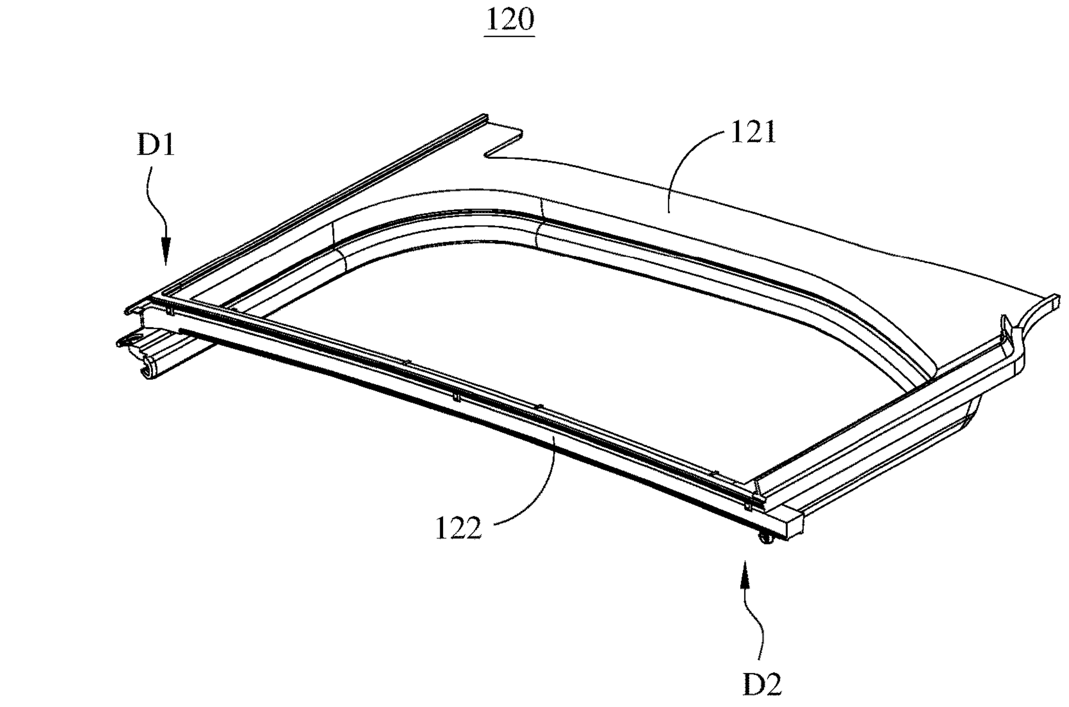
FIG. 4 is a schematic view of an encapsulation assembly provided in embodiments of the disclosure.
Figure 5:
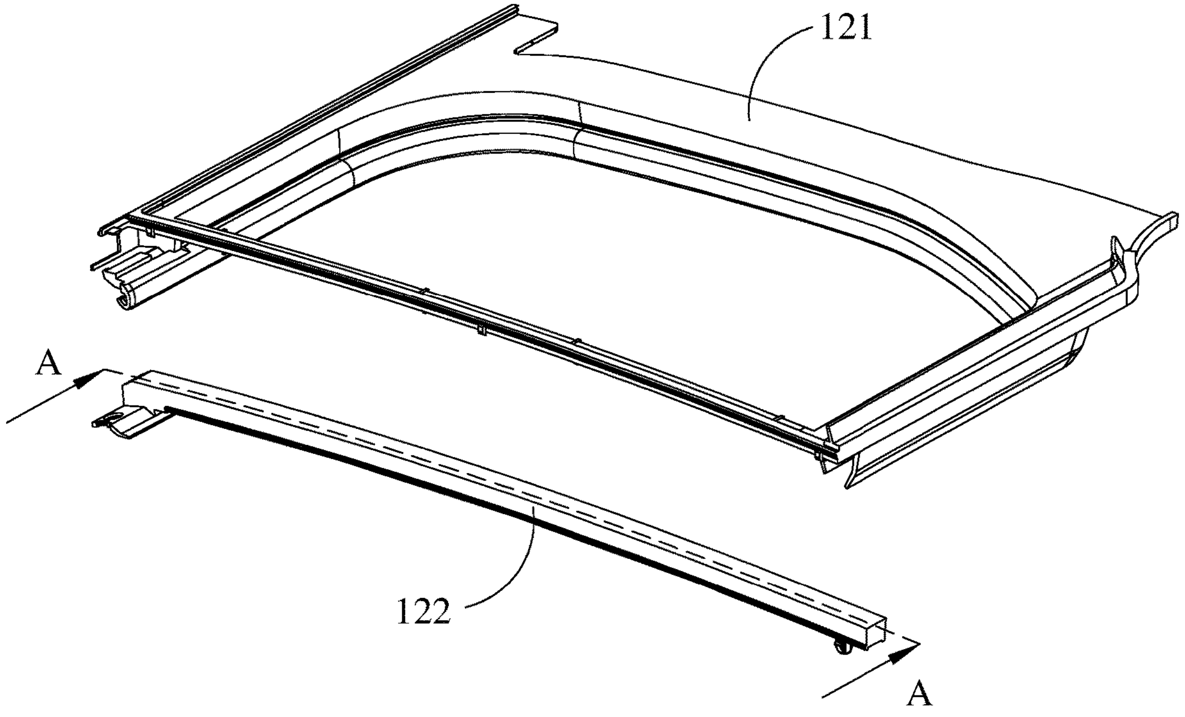
FIG. 5 is an exploded schematic view of an encapsulation assembly and a guide rail provided in embodiments of the disclosure.

Reference is made to FIG. 4 and FIG. 5, the encapsulation assembly 120 includes an encapsulation 121 and an insert 122 connected to the encapsulation 121. The encapsulation 121 is configured to wrap the exterior decorative member 110. At least part of the insert 122 is disposed at the first end D1, and at least part of the insert 122 is disposed at the second end D2. In an embodiment, there is one insert 122, and the insert 122 extends from the first end D1 to the second end D2. In another embodiment, there are two inserts 122. One insert 122 is disposed at the first end D1, and the other insert 122 is disposed at the second end D2. That is, there is no insert 122 between the first end D1 and the second end D2. In the present disclosure, for illustrative purpose, one insert 122 extends from the first end D1 to the second end D2. The insert 122 is configured to be connected to the guide rail 130, and the insert 122 has a less elastic deformation capability than the encapsulation 121.

Specifically, the encapsulation 121 is configured to wrap the periphery of the exterior decorative member 110. The material of the encapsulation 121 may be but is not limited to an elastic material like rubber. When an external force is applied to the encapsulation 121, the encapsulation 121 elastically deforms. That is, the encapsulation 121 may serve as a buffer against an external impact, so as to better protect the exterior decorative member 110.

The insert 122 is long-strip-shaped, and the material of the insert 122 may be but is not limited to a hard material like hard plastic. Under an external force, the insert 122 has a better elastic deformation capability than the encapsulation 121, i.e. the insert 122 has a greater rigidity than the encapsulation 121. That is, the insert 122 is not easy to elastically deform compared with the encapsulation 121. The insert 122 disposed at the first end D1 may serve as the limiting groove C1 mentioned above, and the insert 122 disposed at the second end D2 is connected to the guide rail 130.

It may be understood that, the guide rail 130 is needed to be connected to the encapsulation assembly 120. If the encapsulation assembly 120 has a greater elastic deformation capability as a whole, it may be difficult for the encapsulation assembly 120 to be connected to the guide rail 130. Moreover, the limiting groove C1 may have a limited function for limiting the guide rail 130. In this embodiment, the insert 122 has a less elastic deformation capability than the encapsulation 121, and the insert 122 is configured to be connected to the guide rail 130. In this way, problems brought by great elastic deformation capability of the encapsulation 121 may be avoided.

Figure 6:
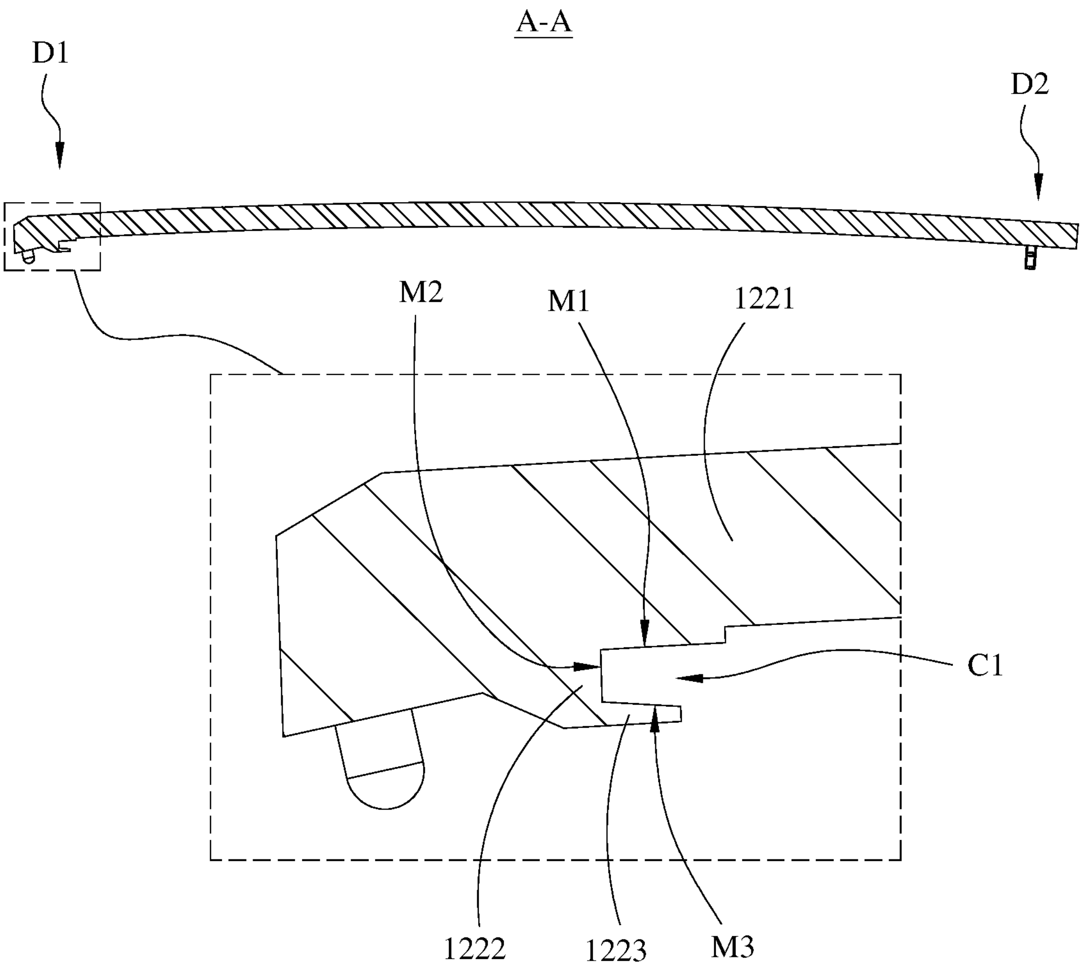
FIG. 6 is a cross-sectional view of the guide rail in FIG. 5, taken along line A-A.

Reference is made to FIG. 6, the insert 122 includes an insert body 1221, a first bending portion 1222, and a second bending portion 1223 connected to each other in sequence in a bent manner. The insert body 1221 extends from the first end D1 to the second end D2, that is, the insert body 1221 and the exterior decorative member 110 are the same in terms of the direction of an edge. The first bending portion 1222 and the second bending portion 1223 each are disposed at the first end D1, and the second bending portion 1223 is disposed spaced apart from and opposite to the insert body 1221. The insert body 1221, the first bending portion 1222, and the second bending portion 1223 cooperatively define the limiting groove C1. Therefore, the insert body 1221, the first bending portion 1222, and the second bending portion 1223 each are able to limit the guide rail 130. Specifically, the insert body 1221 and the second bending portion 1223 are able to limit the guide rail 130 in the Y-axis direction, and the first bending portion 1222 is able to limit the guide rail 130 in the Z-axis direction.

Reference is made to FIG. 6, the insert body 1221 has a first surface M1, the first bending portion 1222 has a second surface M2, and the second bending portion 1223 has a third surface M3. The first surface M1, the second surface M2, and the third surface M3 are connected to each other in sequence in a bent manner and serve as side walls of the limiting groove C1. The encapsulation 121 covers at least one of the first surface M1, the second surface M2, or the third surface M3. In this way, the guide rail 130 inside the limiting groove C1 may abut against the encapsulation 121. Since the encapsulation 121 has a greater elastic deformation capability, the encapsulation 121 inside the limiting groove C1 may elastically abut against the guide rail 130 so as to increase abut tightness between the guide rail 130 and the encapsulation 121, thereby improving a connecting stability between the guide rail 130 and the encapsulation assembly 120.

Figure 7:
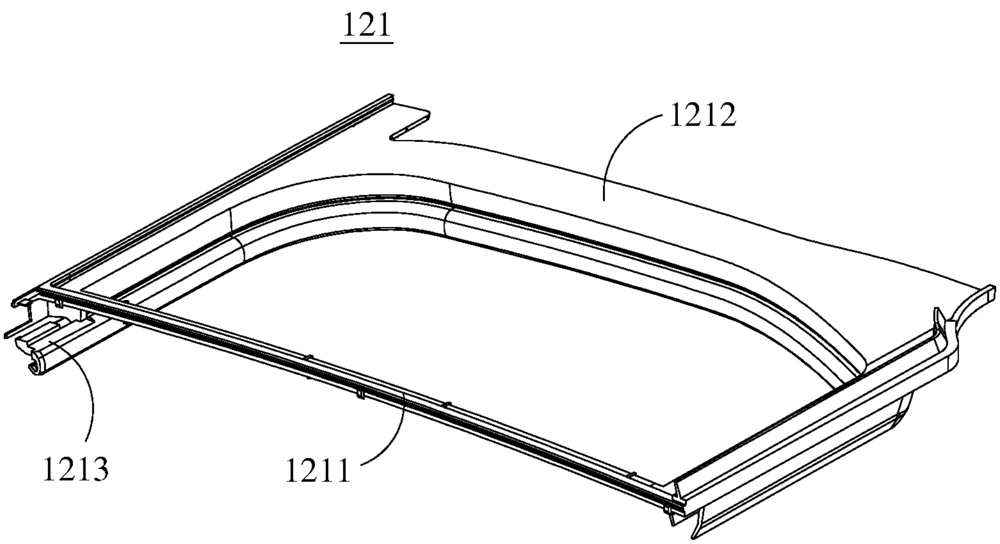
FIG. 7 is a schematic view of an encapsulation provided in embodiments of the disclosure.
Figure 8:
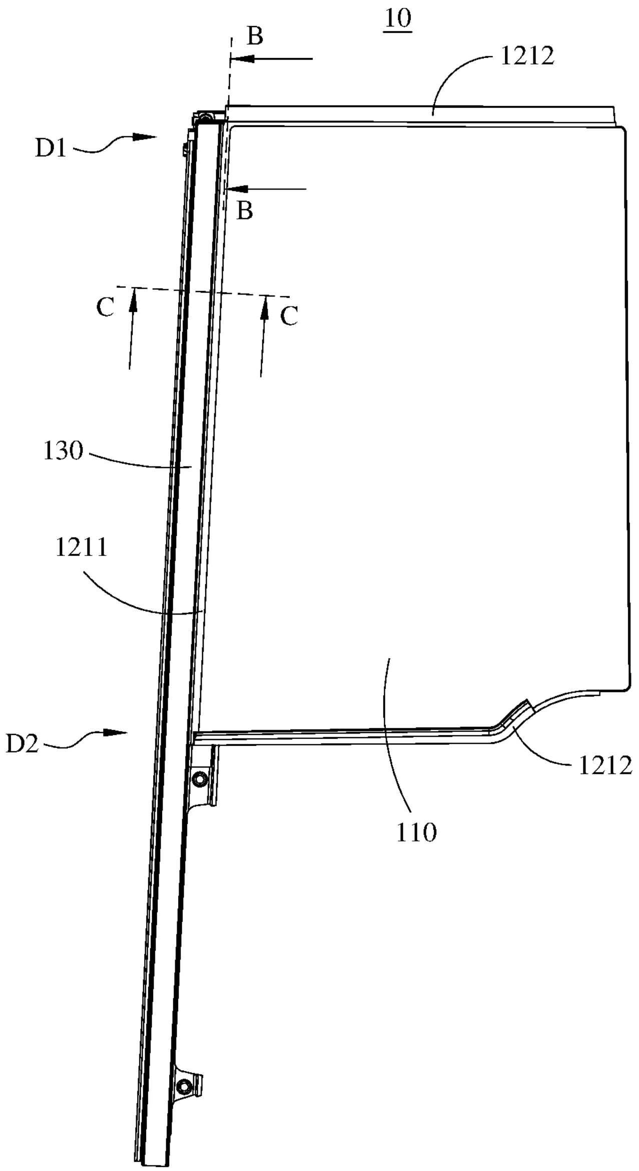
FIG. 8 is a schematic view of a vehicle window assembly provided in another embodiment of the disclosure.
Figure 9:
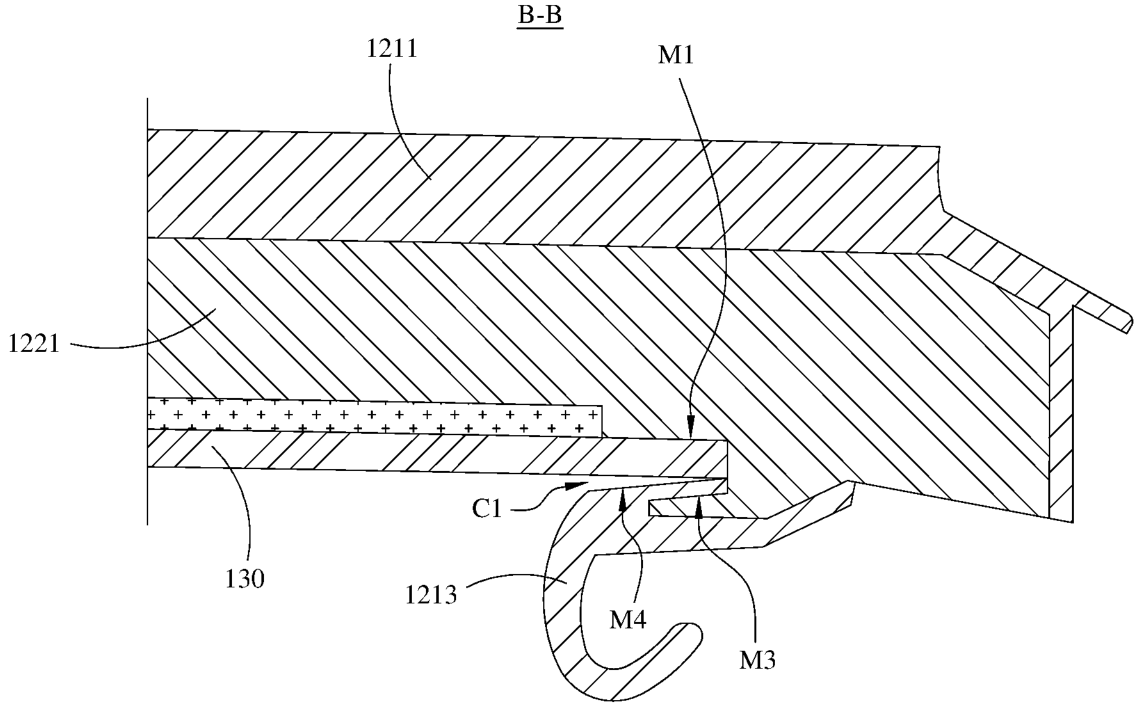
FIG. 9 is a cross-sectional view of the vehicle window assembly in FIG. 8, taken along line B-B.

Moreover, reference is made to FIG. 7 to FIG. 9, the encapsulation 121 includes a connecting portion 1211, a body portion 1212, and an extending portion 1213. The connecting portion 1211 and the body portion 1212 cooperatively wrap the exterior decorative member 110. The body portion 1212 is roughly U-shaped. The connecting portion 1211 extends from the first end D1 to the second end D2, and is stacked with the insert body 1221. Two opposite ends of the connecting portion 1211 are connected to two ends of the body portion 1212 respectively, so as to form a closed annulus. The extending portion 1213 extends from the body portion 1212 at the first end D1, and the extending portion 1213 is disposed spaced apart from and opposite to the connecting portion 1211. The insert body 1221 is disposed between the extending portion 1213 and the connecting portion 1211, and the insert body 1221 is connected to the connecting portion 1211. In an embodiment, the extending portion 1213 covers the third surface M3. A surface of the extending portion 1213 facing the first surface M1 serves as an abutting surface M4, and both the abutting surface M4 and the first surface M1 abut against the guide rail 130. However, in other embodiments, the extending portion 1213 may cover the second surface M2 or the third surface M3, which will not be elaborated herein.

Reference is made to FIG. 9, the abutting surface M4 of the extending portion 1213 is an oblique surface, and a position on the abutting surface M4 farther away from the second surface M2 corresponds to a greater distance from the position to the first surface M1. In other words, since the abutting surface M4 is disposed obliquely, a distance between the first surface M1 and the abutting surface M4 is getting smaller in a direction from the second end D2 to the first end D1. It can be understood that, by setting the abutting surface M4 as an oblique surface mentioned above, the guide rail 130 may be inserted into the limiting groove C1 in an easier and faster way.

Figure 10:
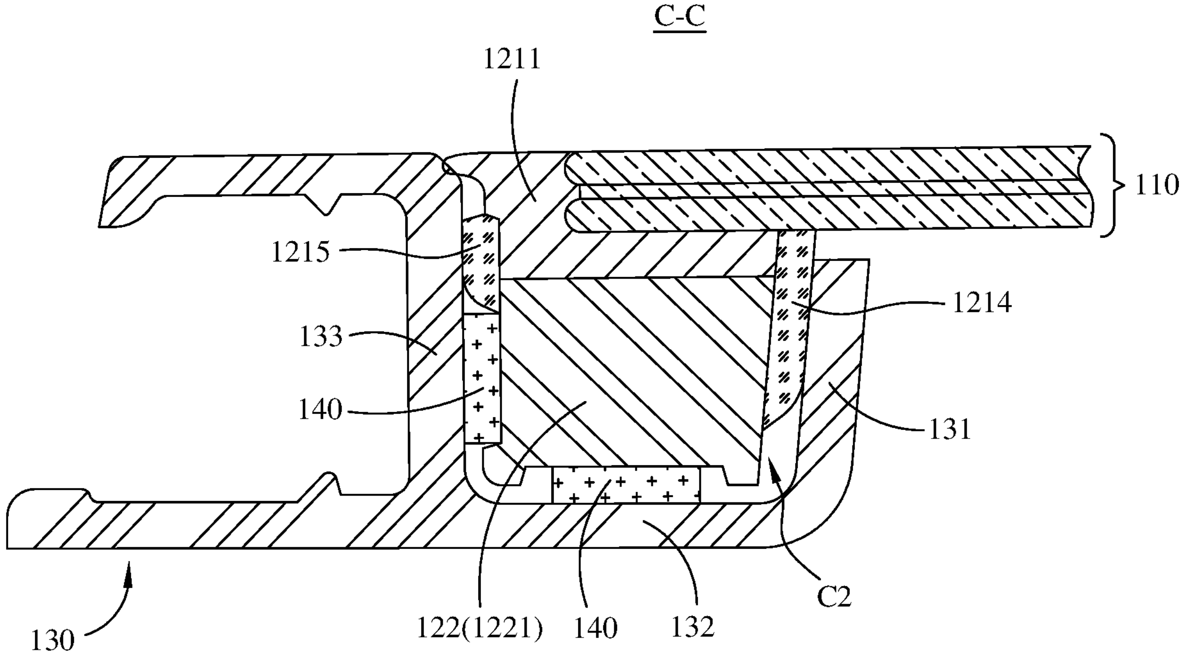
FIG. 10 is a cross-sectional view of the vehicle window assembly in FIG. 8, taken along line C-C.

Reference is made to FIG. 10, the guide rail 130 includes a first plate 131, a second plate 132, and a third plate 133 connected to each other in sequence in a bent manner. The first plate 131 is disposed opposite to the third plate 133. The first plate 131, the second plate 132, and the third plate 133 cooperatively define an accommodating groove C2 that is roughly U-shaped. The accommodating groove C2 is configured to accommodate the insert 122. Two opposite sides of the encapsulation 121 abut against a side of the first plate 131 facing the third plate 133 and a side of the third plate 133 facing the first plate 131 respectively. That is, at least part of the encapsulation 121 is disposed between the first plate 131 and the third plate 133, and abuts against the first plate 131 and the third plate 133 at the same time. In this way, the movement of the guide rail 130 may be limited in the X-axis direction.

Specifically, the encapsulation 121 may further include a first limiting portion 1214 and a second limiting portion 1215. The first limiting portion 1214 and the second limiting portion 1215 are respectively connected to two opposite sides of the connecting portion 1211. The insert body 1221 is sandwiched between the first limiting portion 1214 and the second limiting portion 1215. A side of the first limiting portion 1214 facing away from the insert body 1221 abuts against the first plate 131. A side of the second limiting portion 1215 facing away from the insert body 1221 abuts against the third plate 133. Since the first limiting portion 1214 and the second limiting portion 1215 respectively abut against the first plate 131 and the third plate 133 in an opposite direction, the guide rail may be prevented from shaking in an abutting direction, thereby limiting the movement of the guide rail 130 in the X-axis direction.

Optionally, the first limiting portion 1214 and the second limiting portion 1215 are compressed, and the first limiting portion 1214 elastically abuts against the first plate 131 and the second limiting portion 1215 elastically abuts against the second plate 132. In this way, the guide rail 130 and encapsulation 120 may be fixedly connected.

It may be noted that, there may be multiple first limiting portions 1214 and multiple second limiting portions 1215. Multiple first limiting portions 1214 are disposed spaced apart from each other in a length direction of the connecting portion 1211, and multiple second limiting portions 1215 are disposed spaced apart from each other in a length direction of the connecting portion 1211.

Reference is made to FIG. 10, the vehicle window assembly 10 further includes an adhesive member 140, and the adhesive member 140 is configured to adhere the insert 122 to the guide rail 130. The adhesive member 140 may be but is not limited to polyurethane (PU) adhesive, double-sided tape, etc. PU adhesive is also called as white glue, with a chemical name called polyurethane resin. The insert 122 is accommodated in the accommodating groove C2 and is adhered to at least one of the first plate 131, the second plate 132, and the third plate 133 through the adhesive member 140. There may be one, two, or three adhesive members 140. In FIG. 10, two adhesive members 140 are illustrated as an example. Two sides of the insert 122 respectively adhere to the second plate 132 and the third plate 133 through the adhesive members 140.

In addition, at least part of the adhesive member 140 adheres to a position on the insert 122 between the first end D1 and the second end D2. It can be understood that, with the first end D1 and second end D2 of the insert 122 being connected to the guide rail 130, in this embodiment, a part of the insert 122 between the first end D1 and the second end D2 is further connected to the guide rail 130 through the adhesive member 140, thereby making the connection between the insert 122 and the guide rail 130 more stable. Optionally, the adhesive member 140 may be disposed at the insert 122 before the assembly of the guide rail 130 and the insert 122.

Optionally, if there are multiple adhesive members 140, at least one of the multiple adhesive members 140 extends from the first end D1 to the second end D2, so that the insert 122 may be adhered to the guide rail 130 in the whole length direction. In this way, the insert 122 is more fixedly connected to the guide rail 130.

Moreover, the vehicle window assembly 10 is required to be waterproof and required to reduce noise since the vehicle 1 may be driven in a rainy day or at a high speed. In this embodiment, the adhesive member 140 is disposed between the insert 122 and the guide rail 130 to fill the gap between the insert 122 and the guide rail 130, so that the vehicle window assembly 10 may be waterproof and may be able to reduce noise.

In some embodiments, the adhesive member 140 may be a glue. After the guide rail 130 is adhered to the insert 122 through the adhesive member 140, a certain amount of time is needed for the adhesive member 140 to cure. During the curing process, the guide rail 130 cannot be moved against the insert 122. Therefore, in the related art, a tool/fixture is needed to clamp the guide rail 130 and the insert 122 in order to maintain the relative position between the guide rail 130 and the insert 122 before the curing of the adhesive member 140, and then the adhesive member 140 may be cured. Thus, the process is a waste of tool. In the disclosure, since the guide rail 130 has already been connected to the first end D1 and the second end D2 of the insert 122, the tool is not needed to maintain the relative position between the guide rail 130 and the insert 122. In this way, the tool may not be wasted.

Figure 11:
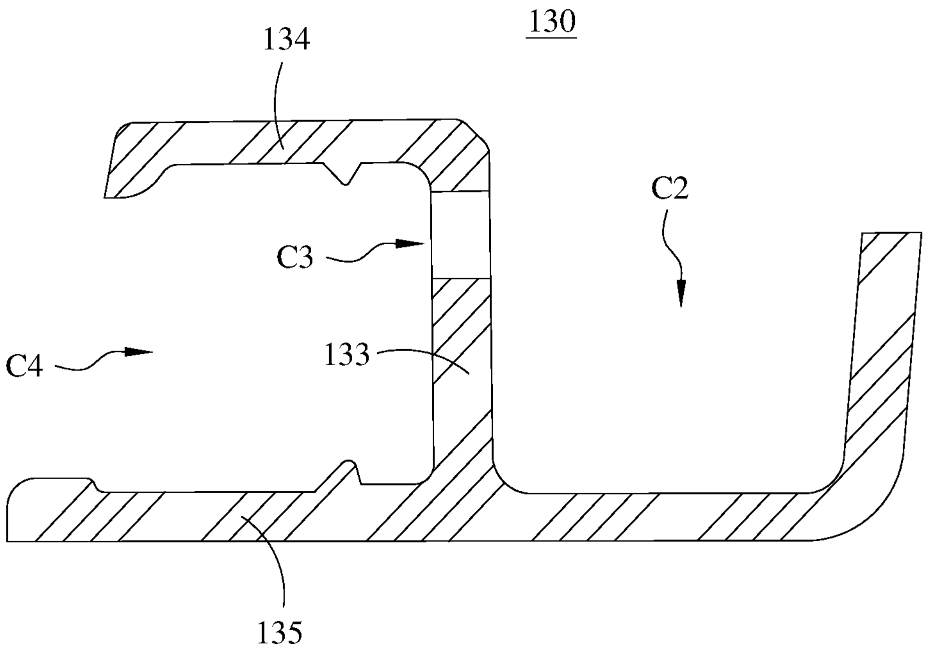
FIG. 11 is a cross-sectional view of a guide rail provided in embodiments of the disclosure.

Optionally, reference is made to FIG. 11, the third plate 133 has a ventilation hole C3. The ventilation hole C3 penetrates the third plate 133 and communicates with the accommodating groove C2. That is, the accommodating groove C2 communicates with the external environment. In this way, the adhesive member 140 may be cured naturally and the speed of curing may be accelerated without additional methods. There may be multiple ventilation holes C3, and the number may be but is not limited to two, three, five, eight, nine, etc. Multiple ventilation holes C3 are spaced apart from each other in a length direction of the third plate 133.

Reference is made to FIG. 11, the guide rail 130 may include a fourth plate 134 and a fifth plate 135 both connected to the third plate 133 in a bent manner. The fourth plate 134 is disposed opposite to the fifth plate 135. The third plate 133, the fourth plate 134, and the fifth plate 135 cooperatively define an accommodating space C4, and the accommodating space C4 is configured to accommodate sealing strips on the vehicle body 20.

Figure 12:
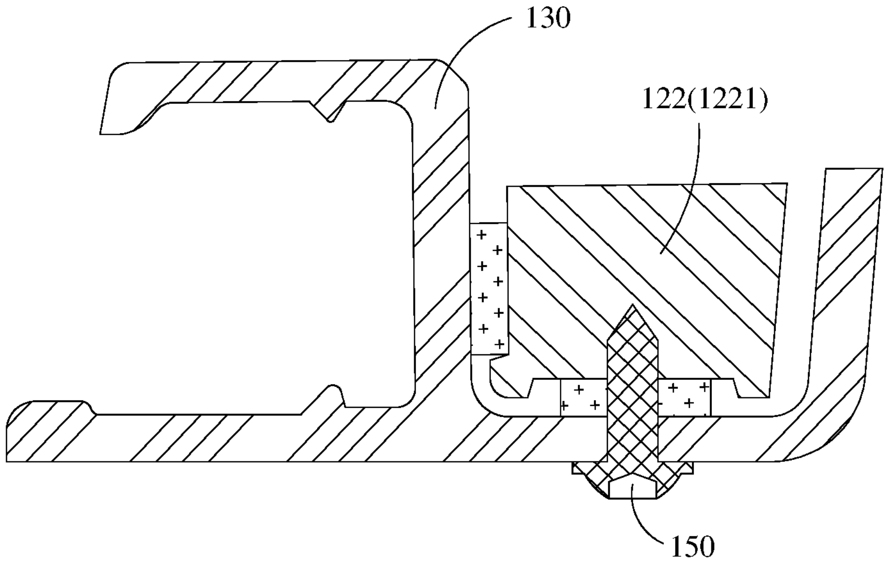
FIG. 12 is a schematic view of a connection between a guide rail and a second end of an encapsulation assembly provided in an embodiment of the disclosure.
Figure 13:
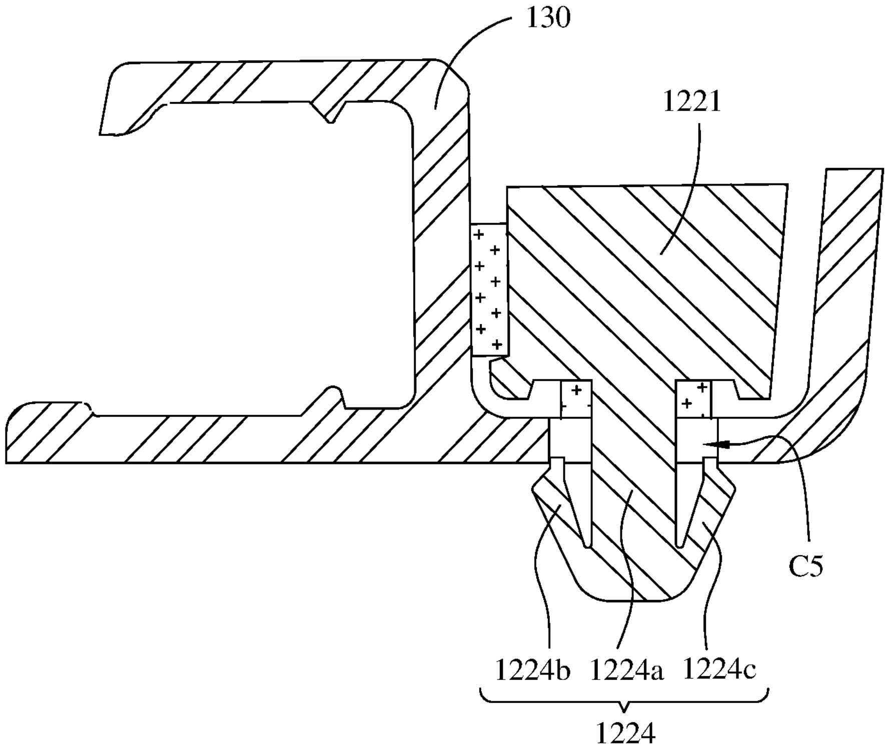
FIG. 13 is a schematic view of a connection between a guide rail and a second end of an encapsulation assembly provided in another embodiment of the disclosure.

The following will describe the connection between the guide rail 130 and the second end D2 of the encapsulation assembly 120. Reference is made to FIG. 12, in an embodiment, the vehicle window assembly 10 further includes a connecting member 150. The connecting member 150 is disposed penetrating the guide rail 130 and the insert 122 to form a fixed connection between the guide rail 130 and the insert 122. The connecting member 150 may be but is not limited to a screw, a bolt, etc. Reference is made to FIG. 13, in another embodiment, the guide rail 130 has a clamping hole C5. The insert 122 further includes a buckle 1224, and the buckle 1224 is fixed to the insert body 1221. The buckle 1224 is inserted into the clamping hole C5, and a radial size of the buckle 1224 is larger than a diameter of the clamping hole C5. Optionally, the buckle 1224 includes a cylindrical portion **1224*a*, a first arm 1224*b*, and a second arm 1224*c*. The cylindrical portion 1224*a* is connected to the insert body 1221, the first arm 1224*b* and the second arm 1224*c* are connected to an end of the cylindrical portion 1224*a* facing away from the insert body 1221, and the first arm 1224*b* and the second arm 1224*c* are obliquely disposed. The first arm 1224*b* and the second arm 1224*c* each are elastically bendable relative to the cylindrical portion 1224*a* to allow the buckle 1224 to be retracted and opened. When the buckle 1224 is retracted, a radial size of the buckle 1224 is reduced. In this case, the radial size of the buckle 1224 is smaller than or equal to the aperture of the clamping hole C5, so that the buckle 1224 may be removed from or inserted into the clamping hole C5. When the buckle 1224 is opened, the radial size of the buckle 1224 is enlarged. In this case, the radial size of the buckle 1224 is larger than the aperture of the clamping hole C5, so that the buckle 1224 may be prevented from withdrawing from the clamping hole C5**.

Figure 14:
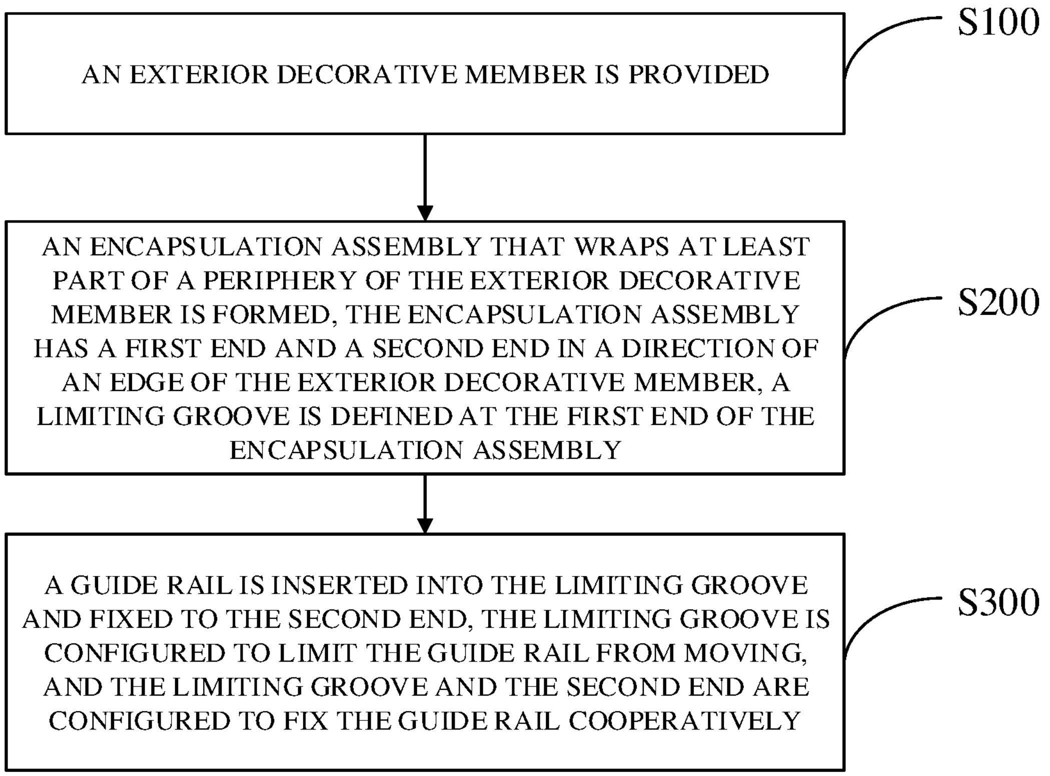
FIG. 14 is a schematic flowchart of an assembly method for a vehicle window assembly provided in an embodiment of the disclosure.

Reference is made to FIG. 14, an assembly method for the vehicle window assembly 10 is provided in the disclosure. Reference of the specific structure of the vehicle window assembly 10 may be made to accompany drawings and description of the above structural embodiments. The assembly method for the vehicle window assembly 10 includes operations at S100, S200, and S300. The introduction of operations at S100, S200, and S300 is as follows.

Figure 15:
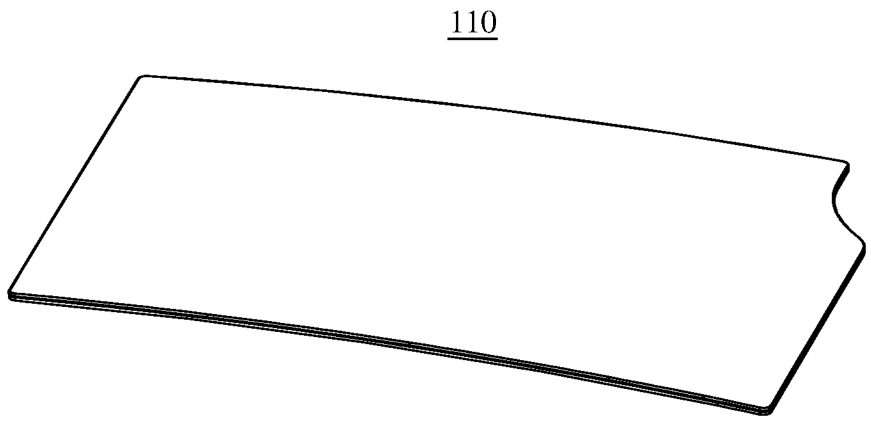
FIG. 15 is a structural view of an exterior decorative member according to the assembly method for a vehicle window assembly in FIG. 14.

At S100, an exterior decorative member 110 is provided, and reference is made to FIG. 15.

Figure 16:
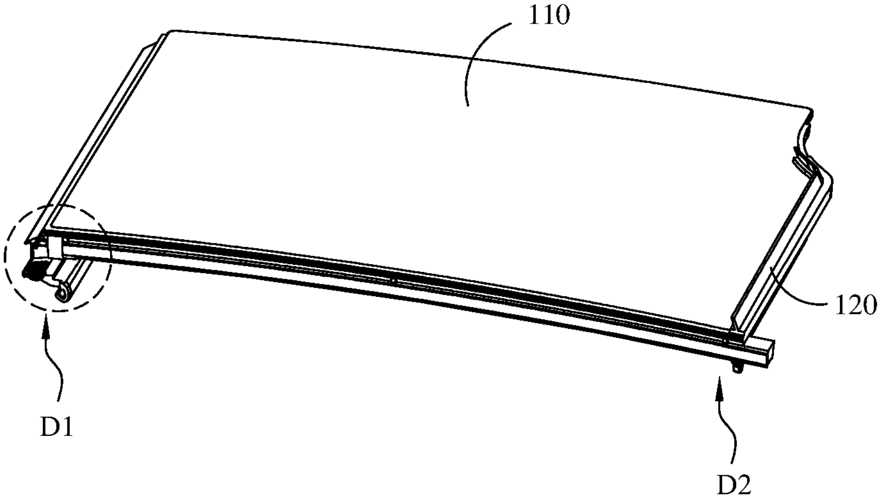
Figure 17:
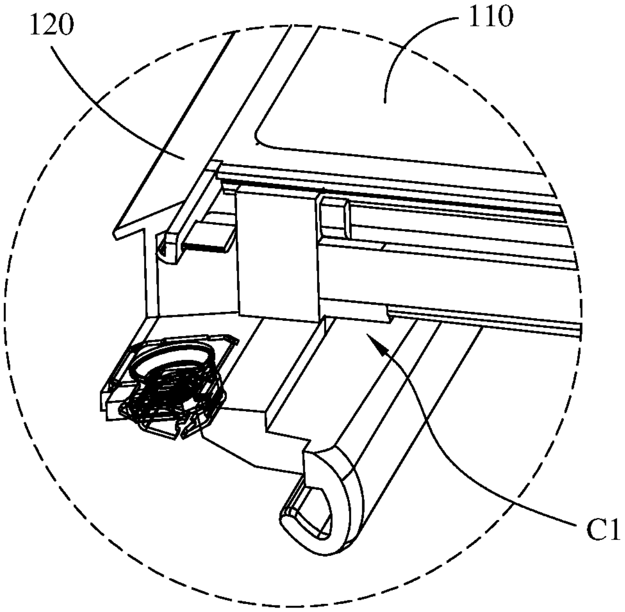
FIG. 17 is a partial structural view of an encapsulation assembly according to the assembly method for a vehicle window assembly in FIG. 14.

At S200, an encapsulation assembly 120 that wraps at least part of a periphery of the exterior decorative member 110 is formed. The encapsulation assembly 120 has a first end D1 and a second end D2 in a direction of an edge of the exterior decorative member 110. The second end D2 is far away from the first end D1. A limiting groove C1 is defined at the first end D1 of the encapsulation assembly 120. Reference is made to FIG. 16 and FIG. 17.

Figure 18:
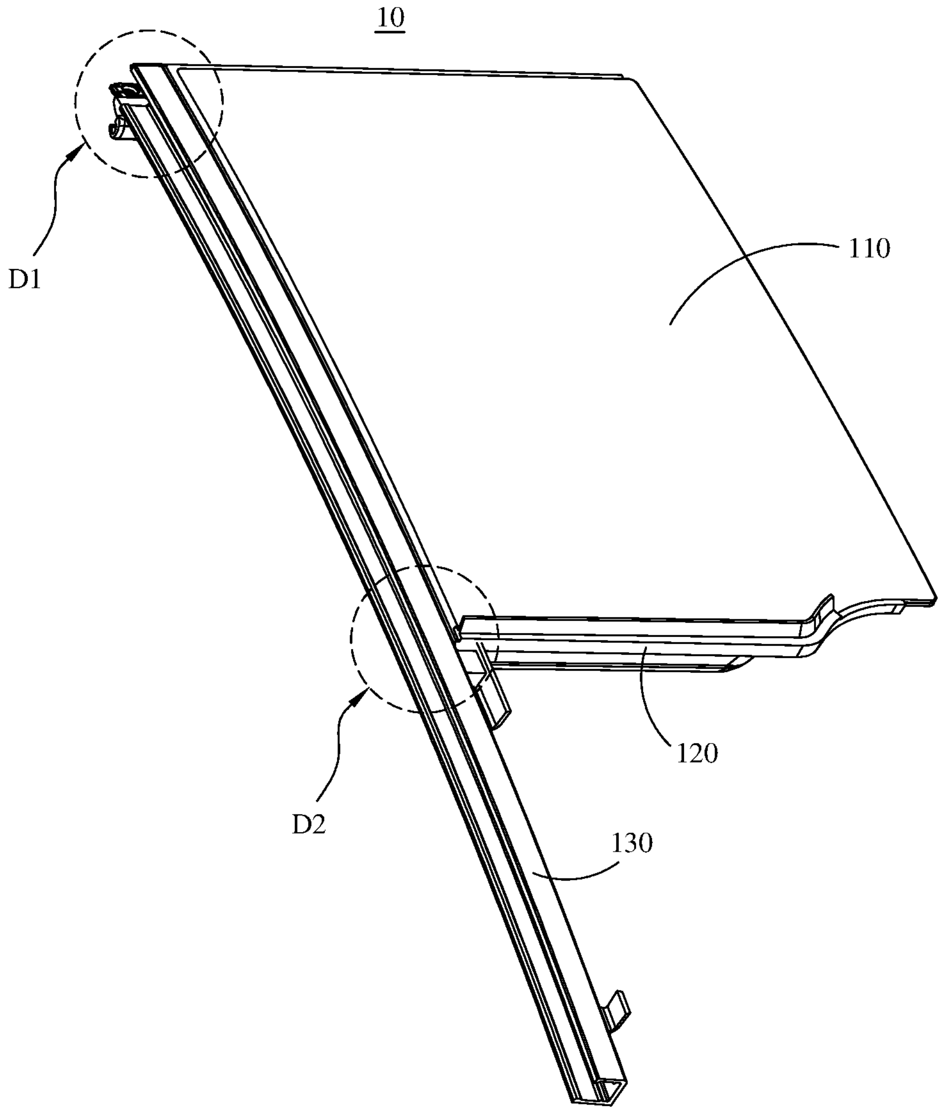
FIG. 18 is a structural view of an exterior decorative member, an encapsulation assembly, and a guide rail after assembly, according to the assembly method for a vehicle window assembly in FIG. 14.

At S300, a guide rail 130 is inserted into the limiting groove C1 and fixed to the second end D2. The limiting groove C1 is configured to limit the guide rail 130 from moving, and the limiting groove C1 and the second end D2 are configured to fix the guide rail cooperatively. Reference is made to FIG. 18.

In this embodiment, the limiting groove C1 at the first end D1 may position the guide rail 130 so as to ensure that the guide rail 130 is correctly positioned at the second end D2 and connected to the second end D2. After the guide rail 130 is connected to the second end D2, the limiting groove C1 and the second end D2 cooperatively fix the guide rail 130 to the encapsulation assembly 120. It can be understood that, inserting the guide rail 130 into the limiting groove C1 is a simple operation. Therefore, compared with the related art, the limiting groove C1 of the vehicle window assembly 10 provided in the disclosure may simplify the assembly of the guide rail 130 and the encapsulation assembly 120, thereby shortening the manufacturing period and improving capability.

It may be noted that, the guide rail 130 and the second end D2 may be fixed together by, but is not limited to, the connecting member 150, the buckle 1224, etc., which will not be elaborated herein. For detailed description, reference may be made to embodiments described above.

Figures 19, 20:
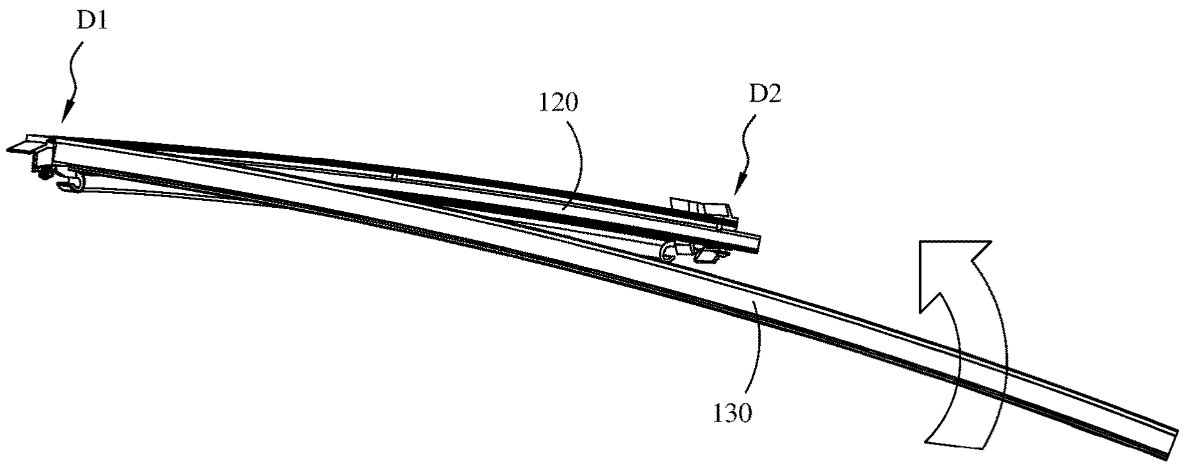
FIG. 19 is a schematic flowchart of an assembly method for a vehicle window assembly provided in another embodiment of the disclosure.
FIG. 20 is a structural view of an exterior decorative member, an encapsulation assembly, and a guide rail after assembly, according to the assembly method for a vehicle window assembly in FIG. 19.

In the previous embodiment, the encapsulation assembly 120 has an abutting surface M4. The abutting surface M4 serves as a bottom wall of the limiting groove C1 and the abutting surface M4 is configured to abut against the guide rail 130. Reference is made to FIG. 19, operations at S300 may include operations at S310 and operations at S320, and description of the operations at S310 and the operations at S320 is as follows.

At 310, the guide rail 130 is obliquely inserted into the limiting groove C1 along the abutting surface M4, and reference is made to FIG. 20.

At 320, the guide rail 130 is rotated with the first end D1 as a center to make the guide rail 130 gradually approach the second end D2 until the guide rail 130 abuts the second end D2, and reference is made to FIG. 20.

The abutting surface M4 is disposed obliquely, so that the opening of the limiting groove C1 gradually decreases in a direction from the second end D2 to the first end D1. In this way, the guide rail 130 may be able to obliquely insert into the limiting groove C1 along the abutting surface M4. After the guide rail 130 is inserted into the limiting groove C1, the guide rail 130 is rotated relative to the encapsulation assembly 120 (the arrow direction illustrated in FIG. 20 is the direction of rotation), so that the guide rail 130 gradually approaches the second end D2 and then the guide rail 130 is connected to the second end D2. In doing so, the guide rail 130 is fixed to the encapsulation assembly 120.

Although embodiments of the disclosure have been shown and described above, it may be understood that, the foregoing embodiments are exemplary and should not be construed as a limitation on the disclosure. Those of ordinary skill in the art may make changes, modifications, replacements and variations to the foregoing embodiments without departing from the scope of this application, and shall be included in the scope of protection of the disclosure.

What is claimed is:

1. A vehicle window assembly, comprising:

an exterior decorative member;

an encapsulation assembly, wherein the encapsulation assembly is disposed around a periphery of the exterior decorative member and wraps at least part of the periphery of the exterior decorative member, the encapsulation assembly has a first end and a second end in a direction of an edge of the exterior decorative member, the second end is opposite to from the first end, and a limiting groove is defined at the first end of the encapsulation assembly; and a guide rail, wherein the guide rail has one end inserted into the limiting groove to limit the guide rail from moving, and the guide rail is connected to the second end of the encapsulation assembly to fix the guide rail to the encapsulation assembly;

wherein the encapsulation assembly comprises an encapsulation and an insert connected to the encapsulation, the encapsulation is configured to wrap the exterior decorative member, at least part of the insert is disposed at the first end and at least part of the insert is disposed at the second end, the insert is configured to connect to the guide rail, and the insert has a less elastic deformation capability than the encapsulation.

2. The vehicle window assembly of claim 1, wherein the insert comprises an insert body, a first bending portion, and a second bending portion connected to each other in sequence in a bent manner; the insert body extends from the first end to the second end, the first bending portion and the second bending portion each are disposed at the first end, and the second bending portion is disposed spaced apart from and opposite to the insert body; and the insert body, the first bending portion, and the second bending portion cooperatively define the limiting groove.

3. The vehicle window assembly of claim 2, wherein the insert body has a first surface, the first bending portion has a second surface, the second bending portion has a third surface; the first surface, the second surface, and the third surface are connected to each other in sequence in a bent manner and serve as side walls of the limiting groove; and the encapsulation covers at least one of the first surface, the second surface, or the third surface.

4. The vehicle window assembly of claim 3, wherein the encapsulation comprises a connecting portion, a body portion, and an extending portion; the connecting portion extends from the first end to the second end, and two opposite ends of the connecting portion are connected to two ends of the body portion respectively; the extending portion extends from the body portion at the first end, and the extending portion is disposed spaced apart from and opposite to the connecting portion; the insert body is disposed between the extending portion and the connecting portion, the extending portion covers the third surface, a surface of the extending portion facing the first surface serves as an abutting surface, and both the abutting surface and the first surface abut against the guide rail.

5. The vehicle window assembly of claim 4, wherein the abutting surface of the extending portion is an oblique surface, and a position on the abutting surface farther away from the second surface corresponds to a greater distance from the position to the first surface.

6. The vehicle window assembly of claim 1, wherein the guide rail comprises a first plate, a second plate, and a third plate connected to each other in sequence in a bent manner; the first plate is disposed opposite to the third plate; the first plate, the second plate, and the third plate cooperatively define an accommodating groove, and the accommodating groove is configured to accommodate the insert; and two opposite sides of the encapsulation abut against a side of the first plate facing the third plate and a side of the third plate facing the first plate respectively.

7. The vehicle window assembly of claim 6, further comprising an adhesive member, wherein the insert adheres to at least one of the first plate, the second plate, or the third plate through the adhesive member; and at least part of the adhesive member adheres to a position on the insert between the first end and the second end.

8. The vehicle window assembly of claim 7, wherein the third plate has a vent hole, and the vent hole communicates with the accommodating groove.

9. A vehicle, comprising a vehicle body and a vehicle window assembly, wherein the vehicle window assembly is mounted on the vehicle body, wherein the vehicle window assembly comprises:

an exterior decorative member;

an encapsulation assembly, wherein the encapsulation assembly is disposed around a periphery of the exterior decorative member and wraps at least part of the periphery of the exterior decorative member, the encapsulation assembly has a first end and a second end in a direction of an edge of the exterior decorative member, the second end is opposite to the first end, and a limiting groove is defined at the first end of the encapsulation assembly; and a guide rail, wherein the guide rail has one end inserted into the limiting groove to limit the guide rail from moving, and the guide rail is connected to the second end of the encapsulation assembly to fix the guide rail to the encapsulation assembly;

wherein the encapsulation assembly comprises an encapsulation and an insert connected to the encapsulation, the encapsulation is configured to wrap the exterior decorative member, at least part of the insert is disposed at the first end and at least part of the insert is disposed at the second end, the insert is configured to connect to the guide rail, and the insert has a less elastic deformation capability than the encapsulation.

10. The vehicle of claim 9, wherein the insert comprises an insert body, a first bending portion, and a second bending portion connected to each other in sequence in a bent manner; the insert body extends from the first end to the second end, the first bending portion and the second bending portion each are disposed at the first end, and the second bending portion is disposed spaced apart from and opposite to the insert body; and the insert body, the first bending portion, and the second bending portion cooperatively define the limiting groove.

11. The vehicle of claim 10, wherein the insert body has a first surface, the first bending portion has a second surface, the second bending portion has a third surface; the first surface, the second surface, and the third surface are connected to each other in sequence in a bent manner and serve as side walls of the limiting groove; and the encapsulation covers at least one of the first surface, the second surface, or the third surface.

12. The vehicle of claim 11, wherein the encapsulation comprises a connecting portion, a body portion, and an extending portion; the connecting portion extends from the first end to the second end, and two opposite ends of the connecting portion are connected to two ends of the body portion respectively; the extending portion extends from the body portion at the first end, and the extending portion is disposed spaced apart from and opposite to the connecting portion; the insert body is disposed between the extending portion and the connecting portion, the extending portion covers the third surface, a surface of the extending portion facing the first surface serves as an abutting surface, and both the abutting surface and the first surface abut against the guide rail.

13. The vehicle of claim 12, wherein the abutting surface of the extending portion is an oblique surface, and a position on the abutting surface farther away from the second surface corresponds to a greater distance from the position to the first surface.

14. The vehicle of claim 9, wherein the guide rail comprises a first plate, a second plate, and a third plate connected to each other in sequence in a bent manner;

the first plate is disposed opposite to the third plate; the first plate, the second plate, and the third plate cooperatively define an accommodating groove, and the accommodating groove is configured to accommodate the insert; and two opposite sides of the encapsulation abut against a side of the first plate facing the third plate and a side of the third plate facing the first plate respectively.

15. The vehicle of claim 14, further comprising an adhesive member, wherein the insert adheres to at least one of the first plate, the second plate, or the third plate through the adhesive member; and at least part of the adhesive member adheres to a position on the insert between the first end and the second end.

16. The vehicle of claim 15, wherein the third plate has a vent hole, and the vent hole communicates with the accommodating groove.

17. An assembly method for a vehicle window assembly, comprising:

providing an exterior decorative member;

forming an encapsulation assembly that wraps at least part of a periphery of the exterior decorative member, wherein the encapsulation assembly has a first end and a second end in a direction of an edge of the exterior decorative member, the second end is opposite to from the first end, and a limiting groove is defined at the first end of the encapsulation assembly; and inserting a guide rail into the limiting groove and fixing the guide rail to the second end, wherein the limiting groove is configured to limit the guide rail from moving, and the limiting groove and the second end are configured to fix the guide rail cooperatively;

wherein the encapsulation assembly comprises an encapsulation and an insert connected to the encapsulation, the encapsulation is configured to wrap the exterior decorative member, at least part of the insert is disposed at the first end and at least part of the insert is disposed at the second end, the insert is configured to connect to the guide rail, and the insert has a less elastic deformation capability than the encapsulation.

18. The assembly method for a vehicle window assembly of claim 17, wherein the encapsulation assembly has an abutting surface, the abutting surface serves as a bottom wall of the limiting groove and is configured to abut against the guide rail; and wherein inserting the guide rail into the limiting groove and fixing the guide rail to the second end comprises:

obliquely inserting the guide rail into the limiting groove along the abutting surface; and rotating the guide rail with the first end as a center to make the guide rail gradually approach the second end until the guide rail abuts against the second end.

* * * * *